June 2, 1964   R. O. RUDOLPH   3,135,128
SEAL FOR CHAIN JOINT
Filed Dec. 8, 1961
FIG. 1.
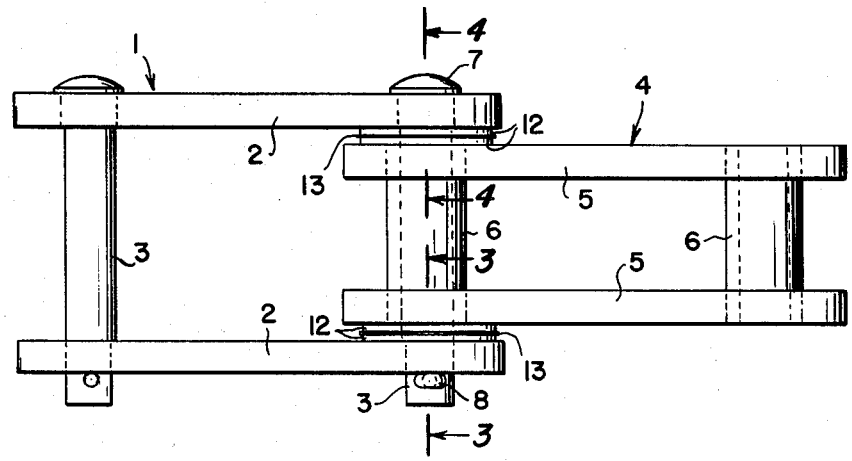
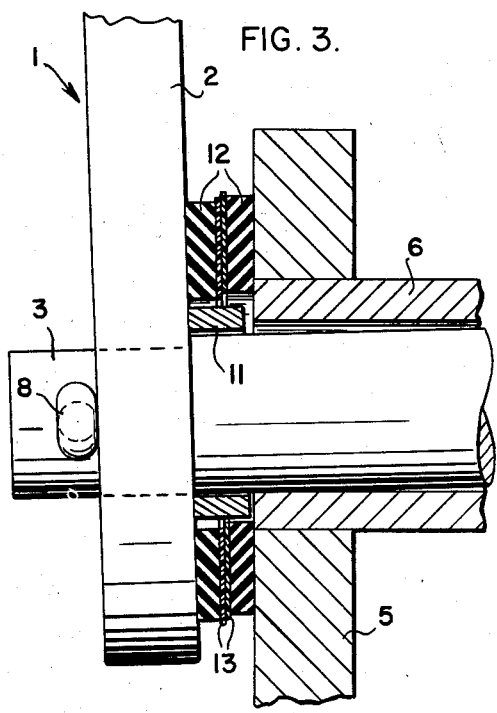
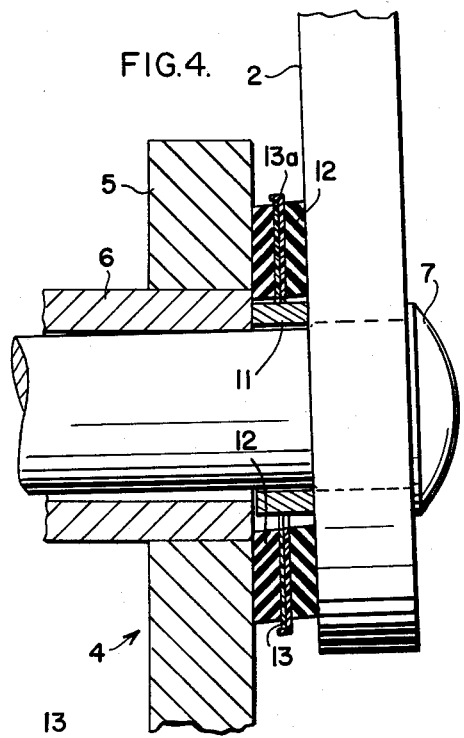
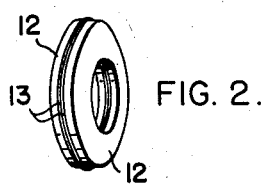
FIG. 2.
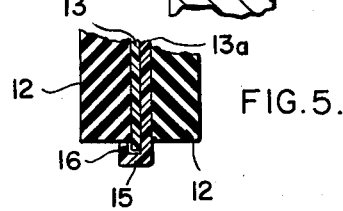
FIG. 5.

3,135,128
SEAL FOR CHAIN JOINT
Richard O. Rudolph, Milwaukee, Wis., assignor to Chain Belt Company, Milwaukee, Wis., a corporation of Wisconsin
Filed Dec. 8, 1961, Ser. No. 158,059
4 Claims. (Cl. 74—255)

This invention relates to seals for chain and particularly to flat seals between the bushing plates and pin plates of a chain. The present invention provides an improved seal having a minimum axial dimension but which nevertheless maintains a seal for the life of the chain. The seal comprises two interengaging low-friction washers of nominal thickness and two high friction resilient pressure washers. The several washers are disposed between the plates of the chain on the chain pin and over a spacing collar located between the end of the bushing and the pin plate. The two collars on each pin cooperate to maintain a given dimension between the plates within predetermined limits. In the assembly of the chain the pressure washers are initially compressed thereby and their compression thereafter maintains the low-friction washers in sealing engagement and also establishes a seal between the corresponding low-friction washers and the bushing or chain plates. The two pressure washers in effect suspend the seal washers therebetween where they are unaffected by small irregularities of the chain parts or angular movements allowed by the relatively loose fit of the pin in the bushing.

An object of the invention is to provide a more effective seal of the chain joints which is impervious to grit, oil and water. The term "chain joints" refers to the space between the parts of each two links of a chain which are interconnected for articulation and in particular hereinafter to the space between the adjoining plates of the interconnected links.

Another object is to more effectively retain a lubricant in the chain joint and to extend the effective life of the seal to correspond generally with that of the chain.

Other objects and advantages of the invention will appear in the following description as illustrated in the accompanying drawings.

In the drawings:

FIGURE 1 is a plan view of two links of a chain provided with similar appearing seals at each opening of the joint;

FIG. 2 is a perspective view of one of the two sealing elements of the seal closing joint openings between the chain links shown in FIGURE 1;

FIG. 3 is an enlarged section taken on line 3—3 of FIGURE 1 through the seal at one end of the pin connecting the links shown;

FIG. 4 is a section taken on line 4—4 of FIGURE 1 through the seal at the headed end of the pin connecting the links shown; and FIG. 5 is a further enlarged section of a part of the seal shown in FIG. 4 wherein the protecting flange has an inwardly extending lip interlocking the two parts of the seal particularly to facilitate their assembly and handling.

The pin link 1 shown in the drawings comprises the pair of plates 2 assembled on the parallel, spaced pins 3. The bushing link 4 comprises the spaced, parallel bushing plates 5 assembled on the bushings 6. Each pin 3 extends through a corresponding bushing 6 of the chain and is rotatable therein for the articulation of the chain at the chain joints. Plates 2 are secured on the ends of pins 3 by any suitable means depending upon their assembly. In smaller chain both ends of the pin are generally headed after assembly. In the chain shown in the drawing, for example, the pins are provided with heads 7 at one end before assembly and are fitted with the cotter pins 8 after assembly. In any type of chain, the bushing plates 5 are assembled on the ends of the bushings with only operating clearances allowed between the bushing plates and pin plates 2. However, the bearing surfaces of the pins and bushings are nonethless exposed to moisture and dirt which enters the chain joint through the clearances referred to while at the same time the lubricant placed in the bushing is worked out of the joint through the same clearances.

According to the present invention, the elements of the seal fit entirely within only a slightly larger clearance provided between the bushing plates and pin plates and over the collar 11 which is mounted or assembled on the pin to maintain the clearance within practical limits. The amount of clearance required is approximately shown in FIG. 1 and it is expected that large chain having a pitch of six inches should not require more than one-quarter of an inch between the plates. In smaller chain the bushings 6 may instead extend through the plates 5 so that the projecting parts of the bushings comprise the collars 11.

The section in FIGS. 3–5 are enlarged to show the parts of the seal which includes the resilient washers 12 of relatively high-friction material such as a soft rubber having a high porosity. The sealing washers 13 are of nominal thickness and may be cut from fabric or sheet material as in FIG. 3 or molded as in the embodiment shown in FIG. 4 wherein the washer 13a includes the overhanging, annular flange 15. Flange 15 may also have a small inwardly extending lip 16 as shown in FIG. 5.

Washers 12 are preferably bonded to the corresponding faces of the respective sealing washers 13 and 13a and the diameter of washer 13 may be slightly larger than the inner diameter of lip 16 so that the four washers will then comprise a readily handled seal assembly which can be placed quickly over collars 11 on pins 3 in the regular course of assembly of the chain. Where employed, the overhanging flange 15 and lip 16 protects the outer exposed joint between seal washers 13 and 13a against entry of direct and particularly high-velocity sprays of water.

The washers 12 and 13 should fit loosely over collars 11 so that each seal assembly can be approximately centered with respect to the range of movement which is allowed the pin in the bushing.

The normal width of washers 12 is of great importance and should be enough so that when compressed between plates 2 and 5, sealing washers 13 are, in effect, suspended between plates 2 and 5. By reason thereof, relative angular movement of the plates does not allow any separation of the sealing washers at any time.

Sealed washers 13 are of low-friction material such as Teflon or nylon so that, with any further degree of articulation of the chain, the high friction washers 12 cause the washers 13 to move relative to each other with no slippages between washers 12 and either of plates 2 or 5.

The relative high and low friction characteristics of the washers thus makes it unnecessary that washers 12 be positively secured to plates 2 or 5. The normal surface irregularities of plates 2 and 5 which washers 12 are provided to conform with also serves to hold the washers in place so that relative movement occurs only between washers 13.

The seal is particularly effective with flange 15, but where sealing washers 13 are of a fabric bonded to the faces of washers 12, for example, the flange could not be readily provided. Nevertheless, such a seal will serve the extended life of the chain because of the relative isolation of the two sealing washers between the plates.

The spacing of plates 2 and 5 is maintained by collars 11 or the equivalent which are located inside the chain joints and are fully protected by the seals.

In the operation of the chain the seal washers are resiliently suspended between the plates of the chain and very small vibratory movements of one link relative to the adjacent link are absorbed by the pressure washers 12. Also, relative angular movement such as illustrated in FIGS. 3 and 4 is readily allowed. In FIG. 3 such movement is accommodated by the resilience of the pressure washers and by some sliding of one seal washer 13 over the other without in any way allowing seal washers 13 to lose contact. In the seal shown in FIG. 4, the annular flange 15 may limit the sliding movement referred to without reducing the effectiveness of the seal.

In all seals it is necessary that some means be provided to prevent crushing of the soft, high-friction washers 12. In larger chain, collars 11 may be preferred as shown. In smaller chain the bushings 6 of the chain might be extended, as already mentioned, and in light chain the annular flange 15 might be extended axially for the purpose.

Various embodiments of the invention may be employed within the scope of the accompanying claims.

I claim:

1. In a chain joint formed by overlying pin plates and bushing plates respectively mounted on the ends of a pin and ends of a bushing turnable on the pin, a spacer collar between each end of the bushing and the adjacent pin plate, means securing the pin plates axially on the pin so that said collars maintain the spacing of the overlying plates within predetermined limits, and a series of washers mounted over each collar and under limited compression between the adjacent plates, said series including two washers in face-to-face engagement having a nominal thickness and a low coefficient of friction and two washers of resilient material and high coefficient of friction having direct engagement respectively with said plates and low-friction washers and having a normal thickness greater than the specified spacing whereby said low-friction washers are maintained in said face-to-face and sealing relation, said washers and the collar having a clearance therebetween and the periphery of the washers being free so that the two resilient high friction washers are allowed to move in all directions with the respective plates.

2. In a chain including overlying pin plates and bushing plates respectively mounted on the ends of a pin and ends of a bushing turnable on the pin, a spacer collar between each end of the bushing and the adjacent pin plate, means securing the pin plates axially on the pin so that said collars maintain the spacing of the overlying plates within predetermined limits, and low-friction and high-friction washers mounted over each collar and under limited compression between the adjacent plates, said washers including two low-friction washers in face-to-face engagement and having a nominal thickness and two high friction washers of resilient material and disposed between and having direct engagement respectively with said plates and the corresponding low-friction washers, said high friction washers having a normal thickness greater than the specified spacing whereby said low-friction washers are maintained in said face-to-face engagement and in sealing relation, said washers having free outer peripheries and an inner diameter greater than the outer diameter of the collars so that the high friction washers are free to move radially with the respective plates and the low friction washers are suspended between the plates by the high friction washers.

3. In a chain including a pin and a bushing turnable on the pin and overlying pin plates and bushing plates respectively fixed on the ends of the pin and of the bushing, collars on said pin between each end of the bushing and the adjacent pin plate to maintain the spacing of the overlying plates within predetermined limits, and two similar low-friction and two similar high-friction washers mounted over each collar and with a clearance between said washers and the collar, the two low-friction washers being in face-to-face engagement and having a nominal thickness and the two high-friction washers being of resilient material and disposed between and having direct engagement with each of said plates and the corresponding low-friction washers, said high-friction washers having a normal thickness greater than the specified spacing whereby said low-friction washers are maintained in said face-to-face engagement and sealing relation and are independently supported between the plates.

4. The invention of claim 2 wherein one of said low friction washers of each seal has an annular flange overhanging the periphery of the other low friction washer to protect the joint therebetween against the direct entry of foreign material.

References Cited in the file of this patent

UNITED STATES PATENTS

| | | |
|---|---|---|
| 2,352,343 | Reynolds | June 27, 1944 |
| 2,411,207 | Hait | Nov. 19, 1946 |
| 2,699,974 | Deffenbaugh | Jan. 18, 1955 |
| 2,906,562 | Burgman | Sept. 29, 1959 |

FOREIGN PATENTS

| | | |
|---|---|---|
| 716,409 | Great Britain | Oct. 6, 1954 |